US008282156B1

(12) United States Patent
Thiele et al.

(10) Patent No.: US 8,282,156 B1
(45) Date of Patent: Oct. 9, 2012

(54) VEHICLE SLIDE DOOR WITH STOP DEVICE

(75) Inventors: Steven R. Thiele, Marysville, OH (US); Myriam Lepire, Montreal (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/190,981

(22) Filed: Jul. 26, 2011

(51) Int. Cl.
*B60J 5/06* (2006.01)

(52) U.S. Cl. ........................... 296/207; 296/155; 49/360

(58) Field of Classification Search .................. 296/207, 296/155; 49/360
See application file for complete search history.

(56) References Cited

U.S. PATENT DOCUMENTS

| | | | | |
|---|---|---|---|---|
| 4,110,934 | A * | 9/1978 | Zens | 49/218 |
| 5,895,089 | A * | 4/1999 | Singh et al. | 296/207 |
| 6,007,141 | A * | 12/1999 | Thomas et al. | 296/155 |
| 6,206,455 | B1 * | 3/2001 | Faubert et al. | 296/155 |
| 6,814,394 | B2 | 11/2004 | Yogo et al. | |
| 7,210,731 | B2 | 5/2007 | Ichinose et al. | |
| 7,360,824 | B2 * | 4/2008 | Nakayama et al. | 296/190.11 |
| 7,422,268 | B2 * | 9/2008 | Kothe et al. | 296/155 |
| 7,814,704 | B2 | 10/2010 | Suzuki et al. | |
| 2010/0018125 | A1 | 1/2010 | Oh | |

FOREIGN PATENT DOCUMENTS

| | | |
|---|---|---|
| JP | 2001173296 | 6/2001 |
| JP | 2007177455 | 7/2007 |

* cited by examiner

*Primary Examiner* — Joseph Pape
(74) *Attorney, Agent, or Firm* — Rankin, Hill & Clark LLP

(57) ABSTRACT

A stop device is provided for a vehicle slide door for an opening of a vehicle side body structure. The slide door is guided in a front-to-rear direction by a sliding door mechanism which moves the slide door on a rail fixed to the side body structure. The stop device comprises a bracket for securing to the side body structure near a rear end of the lower rail. The bracket includes a base having a forward end portion and a rear end portion. A full stopper is mounted to the rear end portion of the bracket, and a mid-stopper is mounted to the forward end portion of the bracket. A strengthening member is connected to and extends at least partially outwardly from the base. The strengthening member is provided at least partially below the full stopper. The strengthening member has a generally stepped configuration.

20 Claims, 8 Drawing Sheets

VEHICLE SLIDE DOOR WITH STOP DEVICE

BACKGROUND

Exemplary embodiments herein generally relate to a vehicle slide door for an opening of a vehicle side body structure and which can open or close in a front-to-rear direction. More particularly, the present disclosure is directed to a stop device for the vehicle slide door which can improve the safety thereof by holding the slide door in a partial open position when the slide door is opened with an open window pane.

In general, a slide door for a vehicle is configured to be guided in a front-to-rear direction by a sliding door mechanism which moves the slide door on rails provided in parallel with one another. The rails include a lower rail and an upper rail, each rail extending in the front-to-rear direction of a vehicle side body structure and are fixed to the side body structure. The sliding door mechanism is typically arranged to move or displace the slide door from a closed position to a full open position where the door is arranged laterally from the side body structure. The sliding door mechanism generally comprises a lower sliding assembly operatively associated with the lower rail and movable along the lower rail and an upper sliding assembly operatively associated with the upper rail and movable along the upper rail. The lower and upper sliding assemblies guide the vehicle slide door in the front-to-rear direction. A full open stopper bracket having a full stopper is typically mounted to the side body structure near a rear end of the lower rail and is engageable by the lower sliding assembly when the slide door is in the full open position.

An example of a known full open stopper bracket 100 is depicted in FIG. 10. As shown, the full open stopper bracket 100 includes a base 102 having a rear end portion 104 and a forward end portion 106. A flange 110 is provided on the rear end portion 104. A full stopper 112 is mounted to the flange 110 of the rear end portion of the bracket 100. The bracket 100 further includes an elevated section 120 provided near the rear end portion 104. The elevated section 120 includes a post 122 which is engaged by the lower sliding assembly in the full open position of the slide door. Mounting apertures 126 and 128 are provided through the base for attaching the full open stopper bracket 100 to the vehicle side body structure.

In the case of the slide door having a window pane that is movable by a window regulator, a portion of an occupant's body could be exposed outwardly from the vehicle, while the window pane is open. In this instance, when the slide door is moved to the full open position, the exposed body part may collide against the vehicle body or be pressed by the slide door. One way for solving this problem, and as depicted in FIG. 10, is to provide a separate mid-stopper bracket 130 spaced forwardly in the front-to-rear direction from the full open stopper bracket 100. The mid-stopper bracket 130 has a mid-stopper 132 which prevents the slide door from being fully opened when the window pane is also opened a predetermined distance. With reference to FIG. 10, the known mid-stopper bracket 130 includes a base 140 having a rear end portion 142 and a forward end portion 144. A flange 146 extends upwardly from and generally normal to the base 140. The mid-stopper 132 is mounted to the flange 146 at the forward end portion of the bracket 130 via a welded plate 148. Mounting apertures 150 and 152 are provided through the base 140 for attaching the mid-stopper bracket 130 to the vehicle side body structure. However, with this known arrangement, there are multiple separate components which increase the weight and cost associated with the slide door stop device.

BRIEF DESCRIPTION

In accordance with one aspect, a stop device is provided for a vehicle slide door for an opening of a vehicle side body structure. The slide door is guided in a front-to-rear direction by a sliding door mechanism which moves the slide door on a rail that extends in the front-to-rear direction of the side body structure and is fixed to the side body structure. The stop device comprises a bracket for securing to the side body structure near a forward end of the lower rail. The bracket includes a base having a forward end portion and a rear end portion. A full stopper is mounted to the rear end portion of the bracket, and a mid-stopper is mounted to the forward end portion of the bracket. A strengthening member is connected to and extends at least partially outwardly from the base. The strengthening member is provided at least partially below the full stopper. The strengthening member has a generally stepped configuration.

In accordance with another aspect, a vehicle slide door assembly for an opening of a vehicle side body structure comprises a lower rail fixed to the side body structure and extending in a front-to-rear direction of the side body structure. A sliding door mechanism is configured to move the slide door on the lower rail in the front-to-rear direction. The sliding door mechanism includes a lower slider associated with the lower rail and movable along the lower rail and a lower control arm pivotally connecting the slide door to the lower slider. A latch is provided on the lower control arm and includes a latch stopper which is configured to protrude toward the lower rail when a window pane provided on the slide door is opened. A stop device is secured to the side body structure near a rear end of the lower rail.

The stop device comprises a one-piece bracket including a base having a forward end portion, a rear end portion, an outboard lateral edge and an inboard lateral edge. A full stopper is mounted to the rear end portion of the bracket. The full stopper is engaged by one of the lower control arm or lower slider when the slide door is in a full open position. A mid-stopper is mounted to the forward end portion of the bracket. The mid-stopper is engaged by the latch stopper to hold the slide door in a partial open position when the window pane is opened. An elevated section is provided near the rear end portion. The elevated section includes a post which is engaged by the latch in the full open position of the slide door. A strengthening member is positioned between the rear end portion and the elevated section. The strengthening member extends at least partially outwardly past the inboard edge of the base. The strengthening member has a generally stepped configuration.

In accordance with yet another aspect, a stop device is provided for a vehicle slide door for an opening of a vehicle side body structure. The slide door is guided in a front-to-rear direction by a sliding door mechanism which moves the slide door on a lower rail. The sliding door mechanism includes a lower slider associated with the lower rail and movable along the lower rail, and a latch having a latch stopper. The lower rail extends in the front-to-rear direction of the side body structure and is fixed to the side body structure.

The stop device comprises a one-piece bracket including a base having a forward end portion, a rear end portion, an outboard lateral edge and an inboard lateral edge. A first flange extends perpendicularly from the rear end portion of the base, and a second flange extending perpendicularly from the forward end portion of the base. A full stopper is mounted to the first flange. The full stopper is engaged by the sliding door mechanism when the slide door is in a full open position. A mid-stopper is mounted to the second flange. The mid-stopper is engaged by the latch stopper of the latch located on the lower slider to hold the slide door in a partial open position when a window pane of the slide door is opened. An elevated section is provided near the rear end portion. The elevated section includes a post which is engaged by the latch in the full open position of the slide door. The post is laterally spaced from the full stopper and substantially aligned vertically with the mid-stopper. A strengthening member is positioned between the first flange and the elevated section. The strengthening member together with the elevated section and the first flange define a tub-shaped portion of the bracket which at least partially extends laterally from the inboard lateral edge of the base and at least partially below the full stopper.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary stop device for the vehicle slide door disclosed herein are merely terms of art that may vary from one manufacturer to another and should not be deemed to limit the present disclosure.

Figure 1:
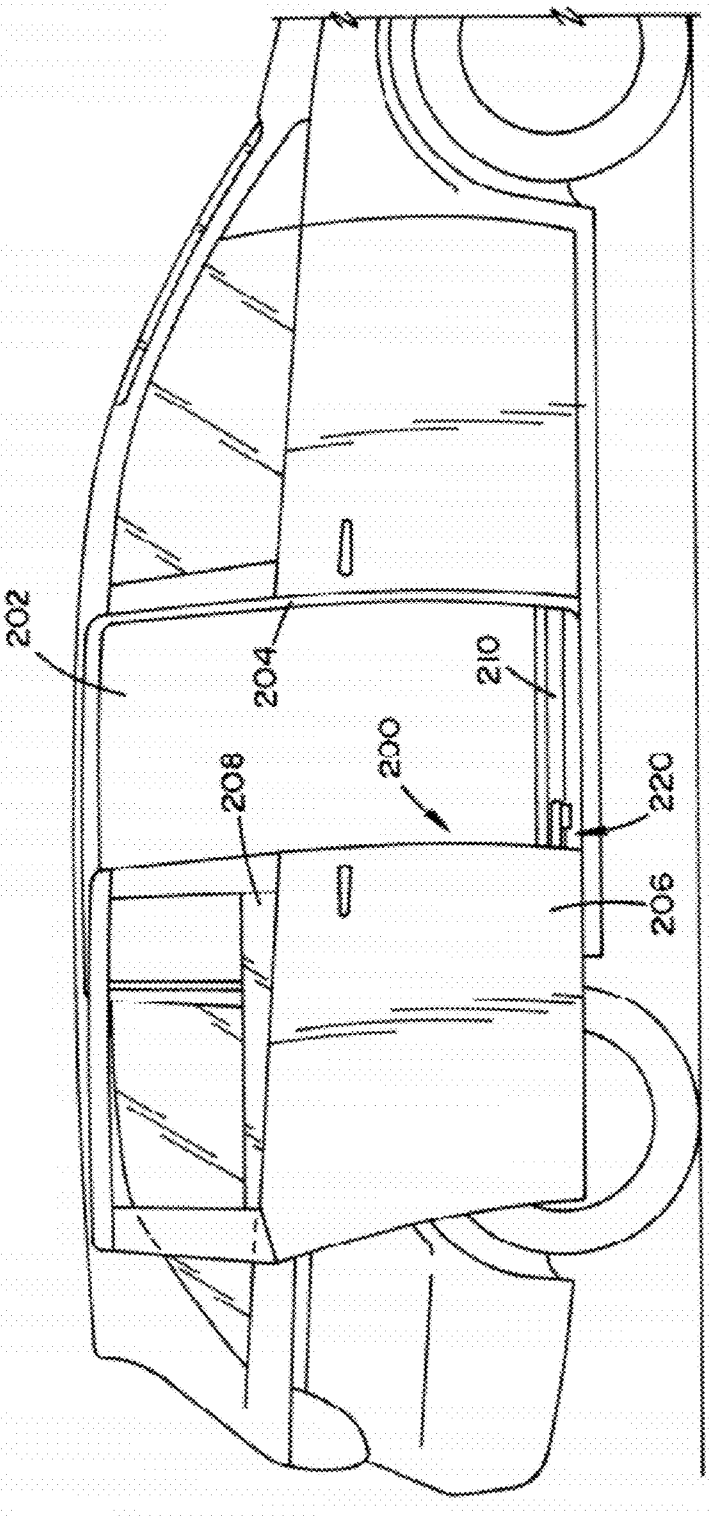
FIG. 1 is a side view of a vehicle including a vehicle slide door assembly for an opening of a vehicle side body structure, the assembly including a slide door being prevented from being fully opened when a window pane of the slide door is opened a predetermined distance.
Figure 2:
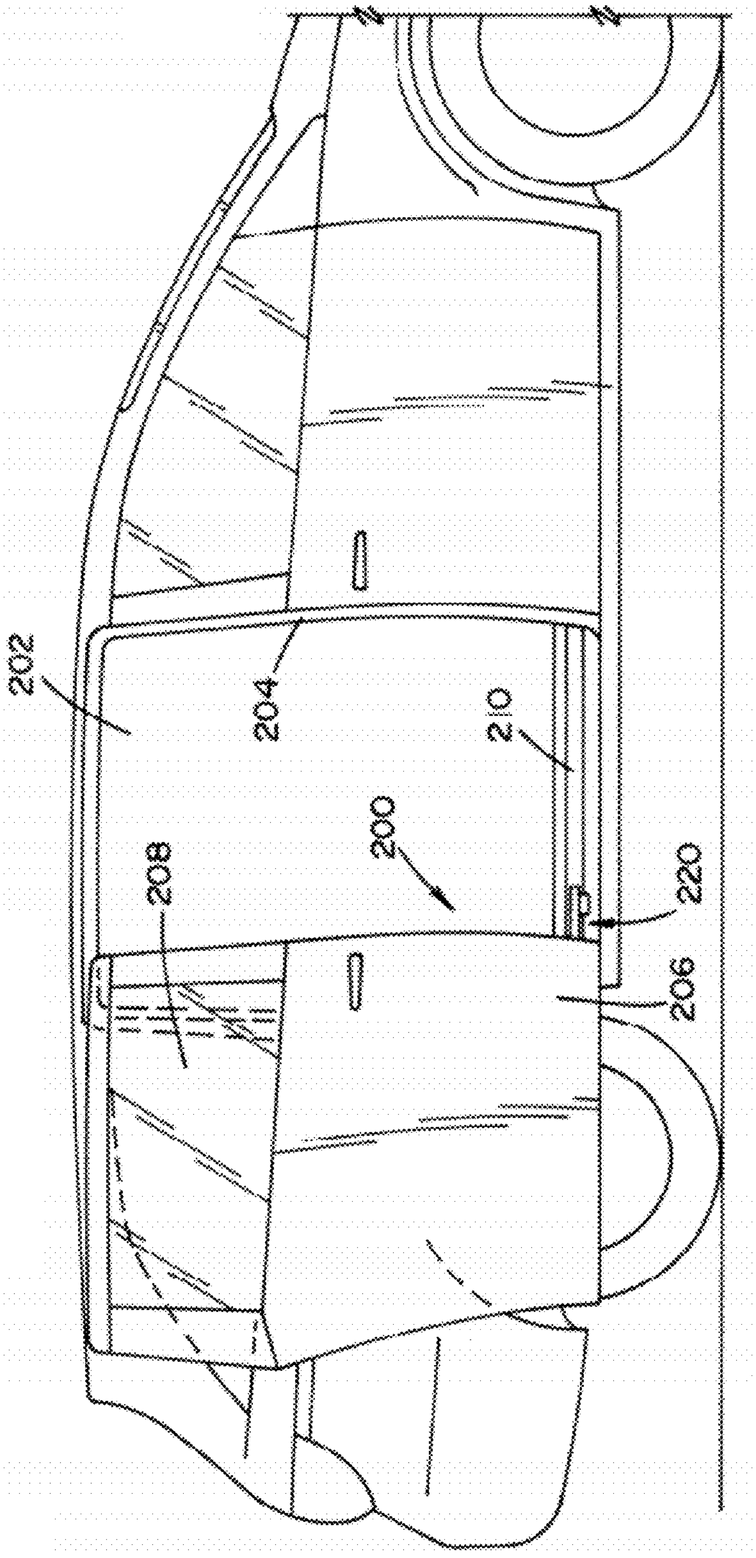
FIG. 2 is a side view of the vehicle slide door assembly of FIG. 1, the slide door being in a full open position when the window pane is closed.
Figure 3:
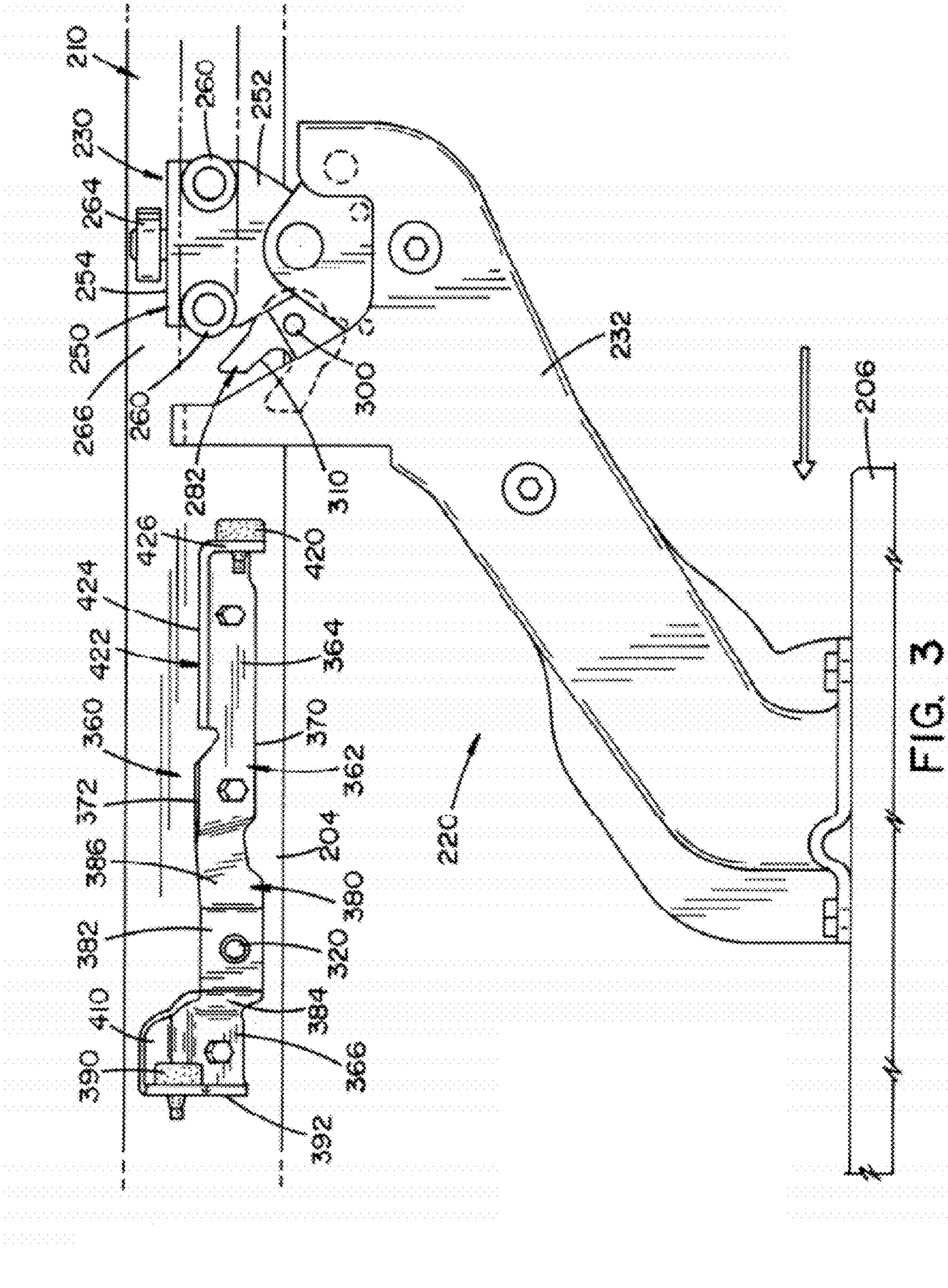
FIG. 3 is a top plan view of a sliding door mechanism for the slide door assembly of FIG. 1 and an exemplary stop device according to the present disclosure.

Referring now to the drawings, wherein like numerals refer to like parts throughout the several views, FIGS. 1-3 illustrate a vehicle slide door assembly 200 for an opening 202 of a vehicle side body structure 204. The slide door assembly 200 comprises a slide door 206 which is movable along a lower rail 210 and an upper rail (not shown) that are fixed to the side body structure 204 and extend in a front-to-rear direction of the side body structure. The slide door 206 includes a window glass or window pane 208 which is movable in a vehicle vertical direction by operation of a window regulator mechanism (not shown).

A sliding door mechanism 220 is operatively connected to a drive mechanism (not shown) for opening and closing a slide door 206 in a front-to-rear direction of a vehicle side body structure 206. The sliding door mechanism 220 is arranged to move or displace the slide door 206 from a closed position where the door 206 generally lies in a first plane of the door opening 202 provided in the vehicle side body structure 204 into a second plane arranged laterally from and approximately parallel to the door plane and to slide the door 206 in the second plane to an open position. The sliding door mechanism 220 is configured to move the slide door 206 on the lower rail 210 and upper rail in the front-to-rear direction.

The sliding door mechanism 220 includes a lower slider 230 operatively associated with the lower rail 210 and movable along the lower rail and a lower control arm 232 pivotally connecting the slide door 206 to the lower slider 230. As shown in FIG. 3, the lower slider 230 generally includes a body 250 having a base 252 and a flange 254 extending outwardly from one (inboard) side of the base. First roller members or wheels 260 are connected to the base 252 and are received in an elongated channel (not shown) defined by the lower rail 210. The first wheels 260 rotate about a generally vertical axis. A second roller member or wheel 264 is connected to the flange 254 and is movable along a track 266 that is fixed to the vehicle body structure 204. The second wheel 264 rotates about a generally horizontal axis. The roller members allow sliding movement of the lower slider 230 along the lower rail 210 as the vehicle door 206 is moving between the closed and open positions, and vice versa. The sliding door mechanism 220 also includes an upper slider (not shown) operatively associated with the upper rail (not shown) and movable along the upper rail and an upper control arm (not shown) pivotally connecting the slide door 206 to the upper slider. These lower and upper sliding assemblies guide the slide door 206 in the front-to-rear direction.

Figure 4:
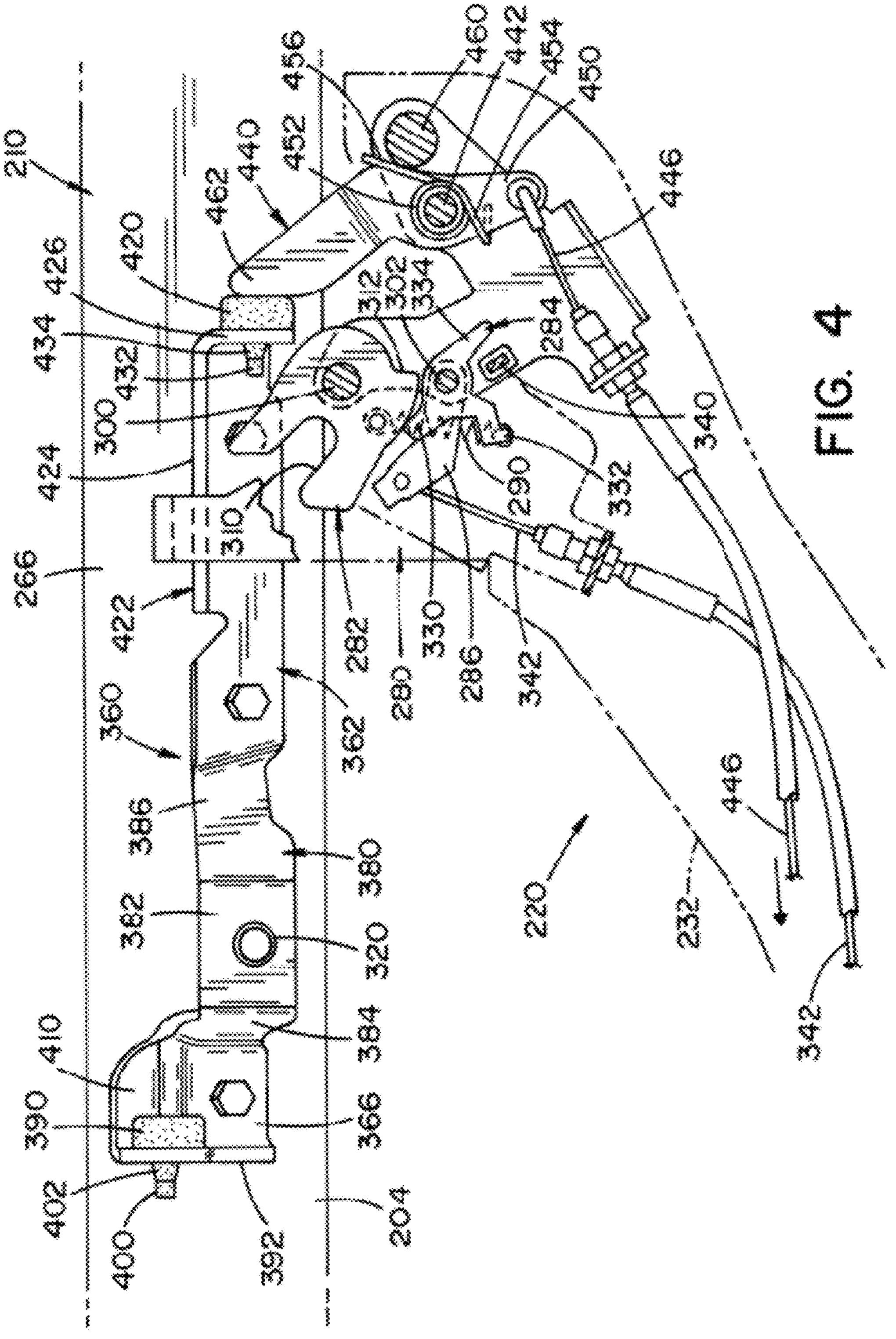
FIG. 4 is a top plan view, partially broken away, of the sliding door mechanism of FIG. 3 engaging a mid-stopper provided on the exemplary stop device which prevents the slide door form being fully opened.
Figure 5:
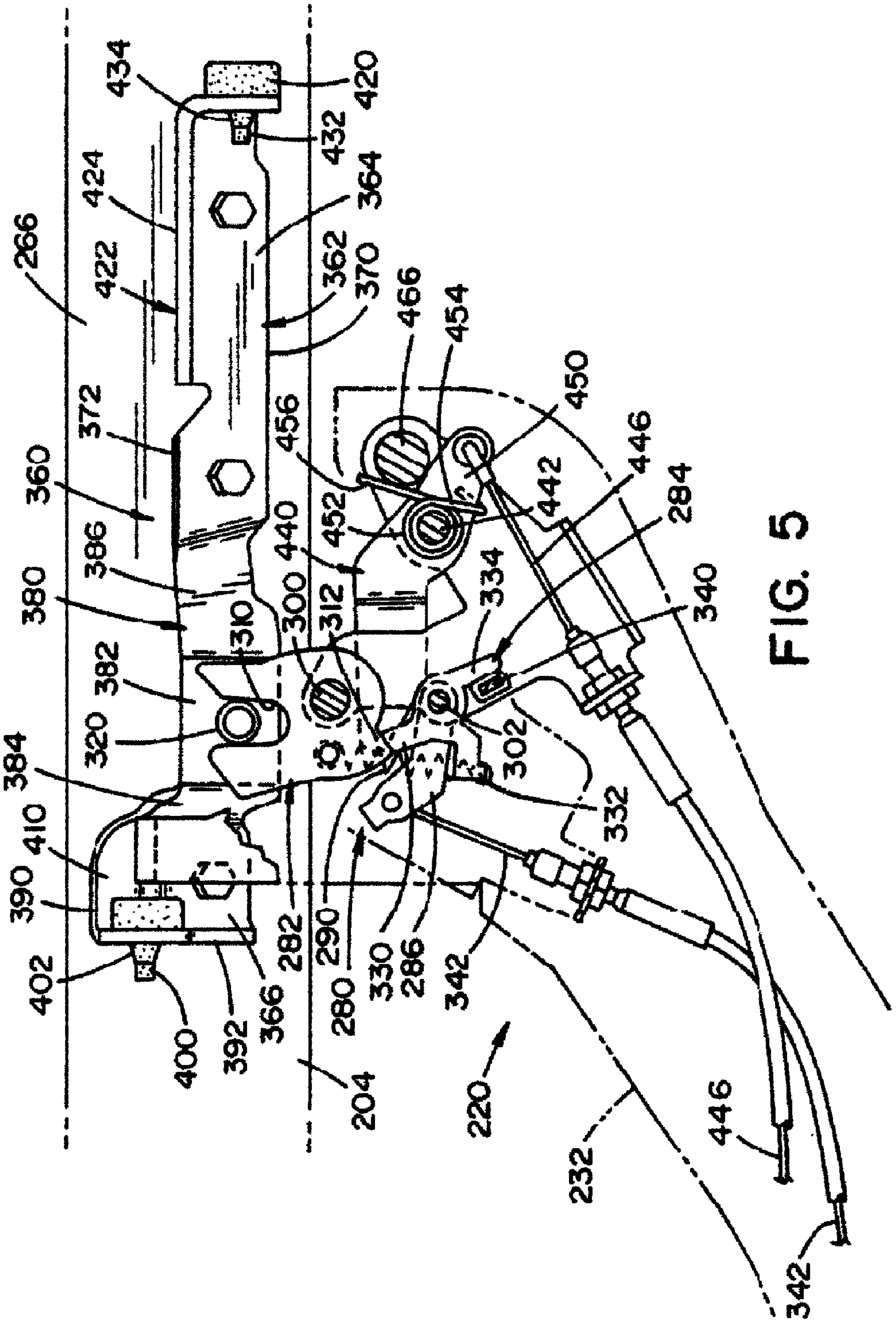
FIG. 5 is a top plan view, partially broken away, of the sliding door mechanism of FIG. 3 engaging a post provided on the exemplary stop device as the slide door moves to the full open position.
Figure 6:
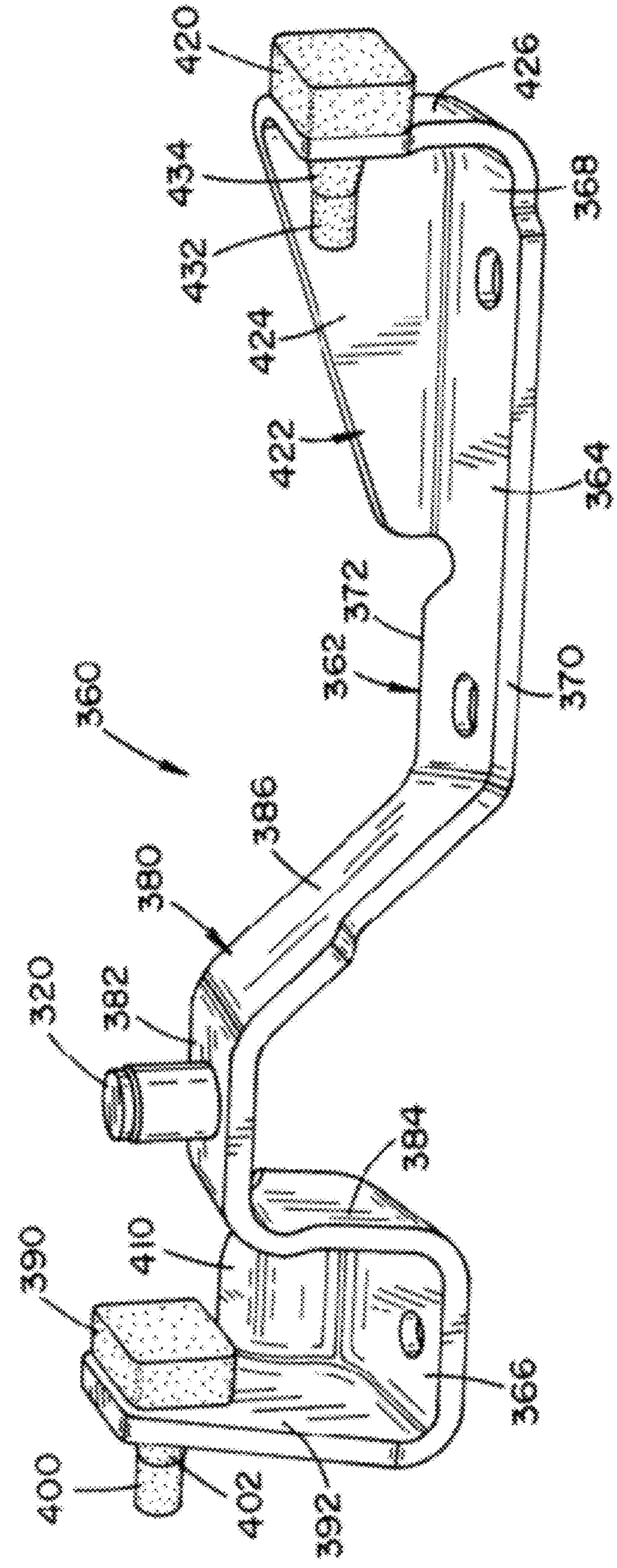
FIG. 6 is a perspective view of the exemplary stop device of FIG. 3.
Figure 7:
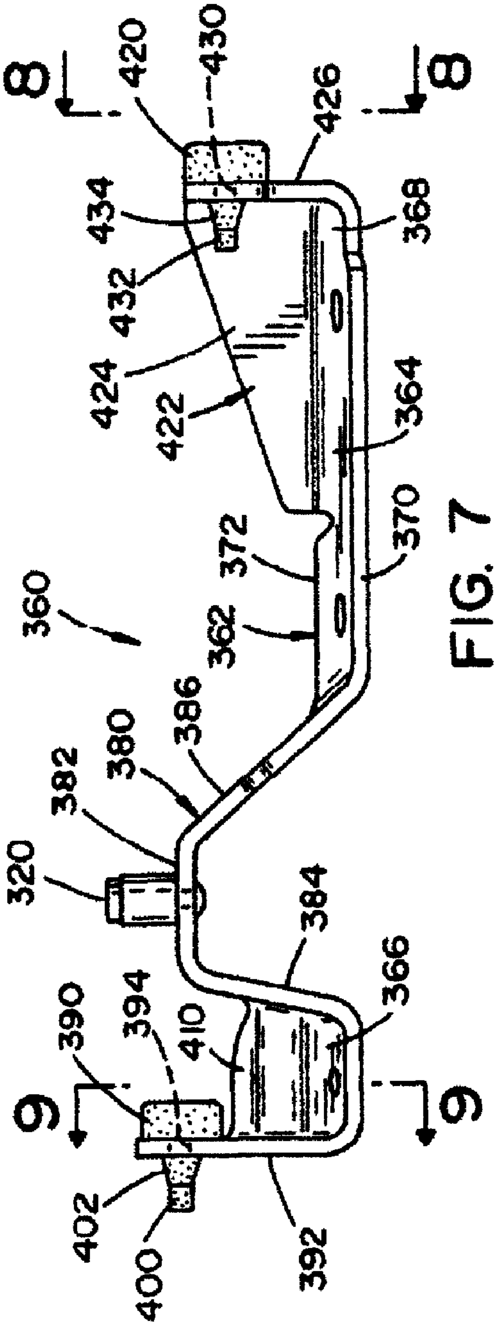
FIG. 7 is a side view of the stop device of FIG. 6.

With reference to FIGS. 4 and 5, a full open latch mechanism 280 is provided on the lower control arm 232 for keeping the slide door in the full open position (FIG. 2). The latch mechanism 280 includes a latch 282, a latch lever 284 and a cable lever 286. A tension spring 290 connects the latch 282 and the latch lever 284. The latch 282 is rotatably connected to the lower control arm 232 via pin 300, and the latch lever 284 and cable lever 286 are rotatably connected to the lower control arm 232 via pin 302. The latch has a meshing groove 310, which is dimensioned to accommodate an engagement member or post 320 provided on the vehicle body structure 204, and a full-latch latching portion 312. The latch lever 284 has an engaging portion 330, an arm portion 332 and a stop portion 334, the three portions being angularly spaced from one another with respect to the pin 302. The tension spring 290 has one end connected to the latch 282 and the other end connected to the arm portion 332. The latch 282 is applied with a force in the counterclockwise direction by the tension spring 290.

In operation, when the window pane 208 is in a closed position, movement of the slide door 206 to the full open position via the sliding door mechanism 220 causes the latch 282 to engage the post 320. As the post 320 is received in the latch groove 310, the latch is caused to rotate in a clockwise direction. This rotation moves the engaging portion 330 of the latch lever 284 along an outer periphery of the latch 282 until the engaging portion 330 contacts the full-latch latching portion 312 (FIG. 5). Further rotation of the latch lever 284 is prevented by the engagement of the stop portion 334 with a stop 340 located on the control arm 232. The latch 282 is maintained in the latched portion depicted in FIG. 5 by the engagement between the latching portion 312 and the engaging portion 330. The cable lever 286 is linked to a door actuator (not shown), such as an operation handle, via a cable 342. Operation of the actuator pulls the cable 342, which, in turn, rotates the cable lever 286 in a counterclockwise direction. This rotation of the cable lever causes the engaging portion 330 of the latch lever 284 to disengage from the latching portion 312. The latch 282 is then moved to the position depicted in FIG. 4 via the tension spring 290 allowing the slide door 206 to move toward the closed position. It should be appreciated that the full open latch mechanism 280 described above is an example of a latch mechanism for holding the slide door 206 in the full open position and that alternative latch mechanisms for the slide door are contemplated.

In the case of the slide door 206 having the window pane 208 that is movable by a window regulator, a portion of an occupant's body could be exposed outwardly from the vehicle, while the window pane 208 is open. In this instance, when the slide door 206 is moved to the full open position, the exposed body part may collide against the vehicle body or be pressed by the slide door 206. To prevent this problem, a stop device 360 is secured to the side body structure 204 near a rear end of the lower rail 210. With particular reference to FIGS. 6-9, the stop device 360 comprises a one-piece bracket 362 including a base 364 having a rear end portion 366, a forward end portion 368, an outboard lateral edge 370 and an inboard lateral edge 372. The bracket 362 further includes an elevated section 380 provided near the rear end portion 366. The elevated section 380 includes a top wall 382 which is canted relative to the base 364. A rear side wall 384 extends substantially perpendicular between the top wall 382 and the base 364. A forward side 386 wall is ramped from the top wall 382 toward the forward end portion 368 of base. The top wall 382 of the elevated section includes the post 320 which is engaged by the latch 282 in the full open position of the slide door 206.

A full stopper 390 is mounted to the rear end portion 366 of the bracket 362. Particularly, the rear end portion of the bracket includes a first flange 392 extending perpendicularly from the base 364. The first flange 392 is canted outwardly relative to the base 364 toward the inboard lateral edge 372 of the base such that a portion of the first flange extends outwardly past the inboard lateral edge 372 of the base (see FIG. 8). The full stopper 390 is mounted to the first flange 392 such that the full stopper 390 is also at least partially laterally spaced (inwardly) from the base inboard later edge 372. To this end, an opening 394 is provided on the first flange. The opening 394 is sized to receive a stem 400 of the full stopper 390. A compressible flared portion 402 is provided on the stem 400. As the stem 400 is inserted through the opening, the flared portion is compressed by the first flange 392. Once the flared portion 402 passes out of the opening 394, the flared portion 402 expands to prevent the stem 400 from being removed from the opening 394. As will be appreciated by one skilled in the art, the full stopper 390 is engaged by one of the lower control arm 232 or lower slider 230 when the slide door 206 overstrokes slightly past the full open position.

Figure 9:
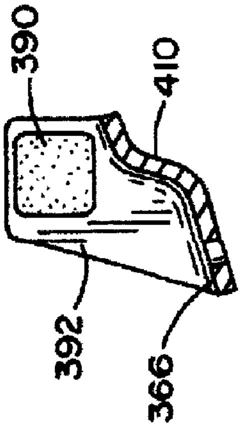
FIG. 9 is a cross-sectional view of the stop device of FIG. 7 taken along line 9-9 of FIG. 7.

With continued reference to FIGS. 6-9, a strengthening member or gusset 410 is positioned between the rear end portion 366 and the elevated section 380 and is provided at least partially below the full stopper 390. As depicted in FIG. 9, the strengthening member 410 has a generally stepped configuration (in a cross-section taken normal to the front-to-rear direction) and is generally S-shaped in the cross-section. The strengthening member 410 spans between the rear side wall 384 of the elevated section 380 and the first flange 392, and together with the elevated section 380 and the first flange 392 define a tub-shaped portion of the bracket 362 which at least partially extends outwardly (i.e., laterally) from the inboard lateral edge 372 of the base 364. This configuration of the strengthening member 410 allows for the one-piece bracket 362 to have a uniform thickness (e.g., the piece of metal from which the one-piece bracket 362 is formed has a uniform or constant thickness throughout).

A mid-stopper 420 is mounted to the forward end portion 368 of the bracket 362. Particularly, the bracket includes a reverse L-shaped second flange 422 extending perpendicularly from the forward end portion 368 of the base 364. The second flange 422 includes a first section 424 and a second section 426 extending perpendicularly from the first section. The first section 422 extends from the inboard lateral edge 372 of the base, and the mid-stopper is mounted to the second section 426 of the second flange 422. Similar to the mounting of the full stopper 390 to the first flange 392, an opening 394 is provided on the first flange. The opening 430 is sized to receive a stem 432 of the mid-stopper 420. A compressible flared portion 434 is provided on the stem 432. As the stem 432 is inserted through the opening 430, the flared portion is compressed by the second flange 422. Once the flared portion 434 passes out of the opening 430, the flared portion 434 expands to prevent the stem 432 from being removed from the opening 430. It should be appreciated that the mid-stopper can be identical to the full stopper which reduces the number of separate parts for the assembly of the stop device 360.

Figure 8:
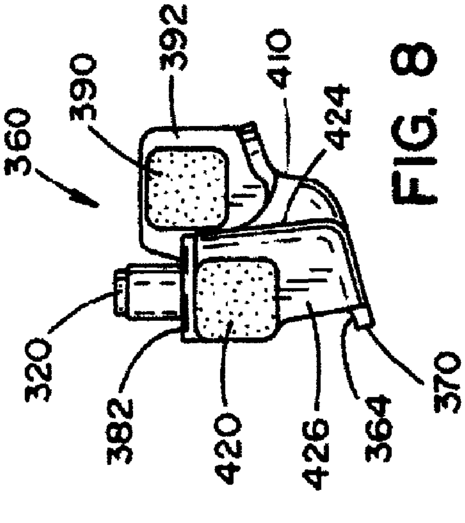
FIG. 8 is a front view of the stop device of FIG. 7 generally along line 8-8.

As best depicted in FIG. 8, each of the first flange 392 and second flange 422 is canted outwardly relative to the base 364, and, as indicated above, the first flange extends beyond the inboard lateral edge 372 of the base. A longitudinal axis defined by the stem 400 of the full stopper 390 is laterally spaced from and elevated relative to a longitudinal axis defined by the stem 432 of the mid-stopper 420. Thus, the full stopper 390 is laterally offset from the mid-stopper 420. Further, the post 320 is laterally spaced from the full stopper and substantially aligned vertically with the mid-stopper.

With reference again to FIG. 4, the mid-stopper 420 is engaged by a latch stopper 440 to hold the slide door 206 in a partial open position when the window pane 208 is opened. More particularly, the latch stopper 440 is pivotally connected to the lower control arm 232 via a supporting pin 442. As is known to one skilled in the art, the latch stopper 440 is operably associated with a window open detecting device (not shown) and a cable 446 for interconnecting the stopper 440 and the detecting device. When the window pane 208 is moved down a predetermined distance, the lower edge portion of the window pane comes in contact with the detecting device and moves the device. The detecting device is connected to one end of the interlocking cable 446 and the cable 446 is pulled by movement of the device. The other end of the cable 446 is connected to a first portion 450 of the latch stopper 440. The latch stopper 440 is pivotably and freely rotated about the supporting pin 442. A torsion spring 452 is mounted to the pin 442 and has a first leg 454 engaged to the latch stopper 440 and a second leg 456 in contact with a pin 460, which is mounted to the control arm 232 near the pin 442. A biasing force of the torsion spring 452 counters a pulling force of the interlocking cable 446. That is, the biasing force of the tension spring 452 retracts a second, engaging portion 462 of the latch stopper 440 towards the slide door 206 (FIG. 5). When the interlocking cable 446 is pulled in response to the down movement of the detecting device (not shown), the latch stopper 440 projects towards the vehicle body structure 204, as depicted in FIG. 4. In this position, the latch stopper 440 will engage the mid-stopper 420 to prevent the slide door 206 from moving toward the full open position.

Figure 10:
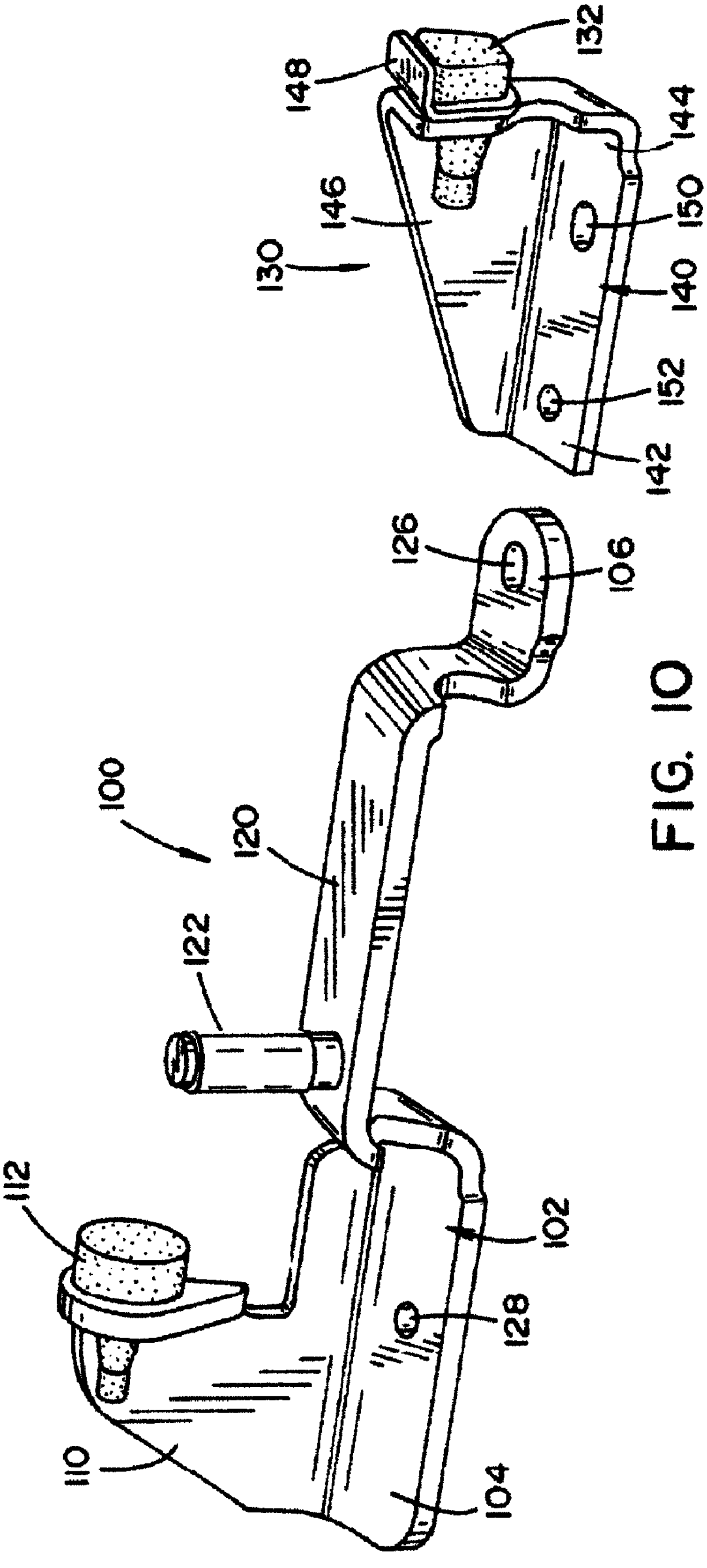
FIG. 10 is a perspective view of a known stop device.

As is evident from the foregoing, the present disclosure provides the one-piece bracket 362 that includes the mid-stopper 420. The one-piece design allows the stopper bracket 362 to be formed of lighter gauge steel with the same structural performance as the known two-piece bracket design shown in FIG. 10. Further, with the one-piece bracket design, a welded plate associated with the mid-stopper can be removed. With regard to the full stopper portion of the bracket 362, the strengthening member 410 is provided at least partially below the full stopper 390 to provide additional rigidity to the full stopper. This allows for a reduction of material for the full stopper portion of the bracket 362 as compared to the known design and the strength of the full stopper 390 is increased.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A stop device for a vehicle slide door for an opening of a vehicle side body structure, the slide door being guided in a front-to-rear direction by a sliding door mechanism which moves the slide door on a rail that extends in the front-to-rear direction of the side body structure and is fixed to the side body structure, the stop device comprising:

- a bracket for securing to the side body structure near a rear end of the rail, the bracket including a base having a forward end portion and a rear end portion;
- a full stopper mounted to the rear end portion of the bracket;
- a mid-stopper mounted to the forward end portion of the bracket; and
- a strengthening member connected to and extending at least partially outwardly from the base, the strengthening member being provided at least partially below the full stopper, the strengthening member having a generally stepped configuration.

2. The stop device of claim 1, wherein base of the bracket includes an elevated section provided near the rear end portion, the strengthening member being positioned between the rear end portion of the bracket and the elevated section.

3. The stop device of claim 2, wherein the rear end portion of the bracket includes a first flange extending perpendicularly from the base, the full stopper being mounted to the first flange, the strengthening member spanning between the first flange and the elevated section.

4. The stop device of claim 3, wherein the strengthening member together with the elevated section and the first flange define a tub-shaped portion of the bracket which at least partially extends laterally beyond an inboard edge of the base.

5. The stop device of claim of claim 3, wherein the first flange is canted outwardly relative to the base, the full stopper being laterally spaced from an inboard edge of the base.

6. The stop device of claim 3, wherein the forward end portion of the bracket includes a reverse L-shaped second flange extending perpendicularly from the base, the mid-stopper being mounted to the second flange.

7. The stop device of claim 6, wherein each of the first flange and second flange is canted outwardly relative to the base, the first flange extending past an inboard edge of the base.

8. The stop device of claim 3, wherein the first flange includes an opening for receiving a stem provided on the full stopper, and the second flange includes an opening for receiving a stem provided on the mid-stopper, a longitudinal axis defined by the stem of the full stopper being laterally spaced from and elevated relative to a longitudinal axis defined by the stem of the mid-stopper.

9. The stop device of claim 8, wherein the stem of each of the full stopper and mid-stopper includes a flared portion, wherein once inserted into the flange opening the flared portion prevents the stem from being removed from the flange opening.

10. The stop device of claim 1, wherein the strengthening member is generally S-shaped in cross-section.

11. A vehicle slide door assembly for an opening of a vehicle side body structure comprising:

- a lower rail fixed to the side body structure and extending in a front-to-rear direction of the side body structure;
- a sliding door mechanism configured to move the slide door on the lower rail in the front-to-rear direction, the sliding door mechanism including a lower slider associated with the lower rail and movable along the lower rail and a lower control arm pivotally connecting the slide door to the lower slider;
- a latch provided on the lower control arm and including a latch stopper which is configured to protrude toward the lower rail when a window pane provided on the slide door is opened; and
- a stop device secured to the side body structure near a rear end of the lower rail, the stop device comprising:
  - a one-piece bracket including a base having a forward end portion, a rear end portion, an outboard lateral edge and an inboard lateral edge,
  - a full stopper mounted to the rear end portion of the bracket, the full stopper being engaged by the one of the lower slider and lower control arm when the slide door is in a full open position,
  - a mid-stopper mounted to the forward end portion of the bracket, the mid-stopper being engaged by the latch stopper to hold the slide door in a partial open position when the window pane is opened,
  - an elevated section provided near the rear end portion, the elevated section including a post which is engaged by the latch in the full open position of the slide door, and
  - a strengthening member positioned between the rear end portion and the elevated section, the strengthening member extending at least partially outwardly past the inboard edge of the base, the strengthening member having a generally stepped configuration.

12. The slide door assembly of claim 11, wherein the full stopper is positioned at least partially past the inboard edge of the base and the strengthening member is provided at least partially below the full stopper.

13. The slide door assembly of claim 12, wherein the bracket further includes a first flange extending perpendicularly from the rear end portion of the base, the full stopper being mounted to the first flange, and a second flange extending perpendicularly from the forward end portion of the base, the mid-stopper being mounted to the second flange.

14. The slide door assembly of claim 13, wherein a section of the first flange extends past the inboard edge of the base.

15. The slide door assembly of claim 13, wherein the elevated section includes a top wall which is canted relative to the base, the post being mounted to the top wall, a rear side wall which extends substantially perpendicular between the top wall and the base, and a forward side wall which is ramped from the top wall toward the rear end portion of base.

16. The slide door assembly of claim 15, wherein the strengthening member spans between the first flange and the rear side wall.

17. The slide door assembly of claim 13, wherein the first flange includes an opening for receiving a stem provided on the full stopper, and the second flange includes an opening for receiving a stem provided on the mid-stopper, the stem of each of the full stopper and mid-stopper includes a flared portion, wherein once inserted into the opening the flared portion prevents the stem from being removed from the opening.

18. The slide door assembly of claim 11, wherein the full stopper is laterally offset from the mid-stopper.

19. A stop device for a vehicle slide door for an opening of a vehicle side body structure, the slide door being guided in a front-to-rear direction by a sliding door mechanism which moves the slide door on a lower rail, the sliding door mechanism including a lower slider associated with the lower rail and movable along the lower rail, and a latch having a latch stopper, the lower rail extending in the front-to-rear direction of the side body structure and is fixed to the side body structure, the stop device comprising:

a one-piece bracket including a base having a forward end portion, a rear end portion, an outboard lateral edge and an inboard lateral edge;

a first flange extending perpendicularly from the rear end portion of the base, and a second flange extending perpendicularly from the forward end portion of the base;

a full stopper mounted to the first flange, the full stopper being engaged by the sliding door mechanism when the slide door is in a full open position;

a mid-stopper mounted to the second flange, the mid-stopper being engaged by the latch stopper of the latch located on the lower slider to hold the slide door in a partial open position when a window pane of the slide door is opened, an elevated section provided near the rear end portion, the elevated section including a post which is engaged by the latch in the full open position of the slide door, the post being laterally spaced from the full stopper and substantially aligned vertically with the mid-stopper; and a strengthening member positioned between the first flange and the elevated section, the strengthening member together with the elevated section and the first flange defining a tub-shaped portion of the bracket which at least partially extends laterally from the inboard lateral edge of the base and at least partially below the full stopper.

20. The device of claim 19, wherein the strengthening member has a generally stepped configuration.

* * * * *